United States Patent Office 3,578,459
Patented May 11, 1971

3,578,459
FOOD PRODUCT
James E. Corbin, Webster Groves, Mo., assignor to The Ralston Purina Company, St. Louis, Mo.
No Drawing. Filed July 18, 1968, Ser. No. 745,682
Int. Cl. A23l 1/10
U.S. Cl. 99—1  16 Claims

ABSTRACT OF THE DISCLOSURE

The method of producing a novel food product comprising coating the surfaces of a substantially dry food product with an edible, chemically reactive composition which, when contacted with an aqueous liquid, forms an exothermic reaction, thereby producing a resulting heated food product.

BACKGROUND OF THE INVENTION

This invention relates to food products and, more particularly, to foods which result in the production of heated food products.

The art is familiar with food products, particularly, pet foods or cereals which are currently available to the consumer. These products include the dry cereal-type which may be consumed in the dry form or may be mixed together with liquids such as water or milk products to make a more palatable mixture. However, all of the products currently available are of the "cold" type, i.e., any heat that may be imparted to any food product must be applied from an external source. Since it is generally known that warm or heated type food products are more attractive and palatable for human or animal consumption, it would be highly desirable to provide a method for producing such products to provide the consumer with a product that would be easy to use and not require the application of an external heat source to obtain a warm or heated palatable food product.

SUMMARY OF THE INVENTION

In accordance with the present invention, a novel food product is accomplished in a method which comprises contacting and substantially coating the surfaces of a dry, food product with an edible, chemically reactive composition, said composition forming an exothermic reaction when contacted with an aqueous liquid and thereby forming a resulting heated food product.

The particular coating composition placed on the surfaces of the dry food product reacts with the aqueous liquid to form an exothermic reaction which in turn provides the heat necessary to raise the temperature of the food product. The aqueous liquid also provides the necessary moisture to soften the dry food product to make it more palatable.

DESCRIPTION OF THE PREFERRED EMBODIMENTS

The present invention is best accomplished in a method which comprises substantially coating the surfaces of a dry cereal-type food product, e.g., cereals or dog food, with a chemically reactive composition. Such chemically reactive compositions include calcium oxide, phosphorous pentoxide, strontium oxide, barium oxide and the like. The chemically reactive compositions may be present on the food product in a range of from about 0.003% by weight to about 10% by weight based on the total weight of the food product and preferably from about 3% by weight to about 5% by weight. Where calcium compositions are employed, such compositions provide a readily available source of calcium to supplement the mineral diet.

The chemically reactive composition may be applied to the dry food product in any known manner which would provide for substantially coating the exterior surfaces thereof.

The above coated food product must be contacted with an aqueous liquid in order that the chemically reactive composition may combine with said liquid to form an exothermic reaction and thus produce a resulting heated product. The liquid employed may be any liquid that, when contacted with the chemically reactive composition, would produce an exothermic reaction, e.g. water. However, it has been found that a reaction may be initiated at a more rapid rate by the addition of an edible acid to the water prior to contacting the water with the coated food product. The amount of liquid employed with the coated food product should be in the range from about 20% to about 150% by weight based on the total dry weight of the food product.

The edible acids that may be employed in the liquid portion of the composition include phosphoric acid, hydrochloric acid, citric acid, acetic acid, and the like. In the case of phosphoric acid, it has been found that the phosphorous ions counterbalance, for example, the calcium, where calcium oxide is employed as the chemically reactive composition, to produce a food product having a desirable and nutritious mineral balance. Such acids should be present in an amount from about 0.05% by weight to about 15% by weight based on the total dry weight of the food product and preferably from about 0.5% by weight to about 10% by weight.

The basic dry cereal-type of food product which is employed in the invention may be any of the various, commercially available types of products now available to the consumer. It is essential that the food product be substantially dry since any excessive moisture would cause the chemically reactive coating to react prior to consumption. Moisture should not be present in the food product in an amount in excess of about 10% and preferably about 5% or less.

The coated food product and the aqueous liquid may be mixed in any conventional manner to permit the chemically reactive coating to contact said liquid. Tests show that the particular components employed in producing the food products of the invention result in products having an elevated temperature of from about 80° F. to about 120° F. as compared to a room temperature of, for example, 75° F.

The particular method of preparation and resulting product of the invention provides a means of providing a heated food product without the necessity of applying an external heat source. The products of the invention may be packaged, for example, in a moisture-impermeable two-compartment plastic bag having a breakable diaphragm positioned between the compartments with the substantially dry coated product in one compartment and the liquid in the other. The consumer need only break the diaphragm to cause the liquid to combine with dry, coated product to obtain the heated product of the invention.

The following examples are illustrative of the invention and are not intended to limit the scope thereof.

EXAMPLE 1

One hundred fifty grams of a commercially available dry cereal-type dog food were mixed together with 4 grams of calcium oxide. Mixing was conducted until substantially all surfaces of the dog food was coated with a thin layer of the calcium oxide. In a separate container, 4.0 mls. of phosphoric acid were added to 100 mls. of water and the resulting mixture was mixed together with the calcium oxide-coated dry dog food. The temperature of the coated dog food was about 75° F. prior to the addition of the acid-water liquid. After mixing, the exothermic reaction between the calcium oxide coated dog food and the acid-water liquid caused the temperature of the dog food to rise to a temperature of about 94.5 F., a rise in temperature of nearly 20° F.

A test was conducted to determine the degree of preference of the heated product over a product at room temperature. Ten dogs were each given two feeding pans containing their feed. One pan contained a dog food prepared by adding about 100 mls. of water (about 75° F.) to 100 gms. of a dry cereal-type food product. The other pan contained the heated product made in accordance with the procedure of Example 1. Several pounds of each type of feed were prepared for the test.

The test results show that all ten dogs ate from both pans consuming about 18 pounds of the non-heated product with one dog preferring the non-heated product. However, the same ten dogs consumed about 38 pounds of the product of the invention with nine dogs preferring the heated product.

EXAMPLE 2

The procedure of Example 1 is substantially repeated except that water only is employed as the liquid. The temperature of the dog food was raised about 15° F. The resulting product is substantially the same as that produced in accordance with Example 1.

EXAMPLE 3

The procedure of Example 1 is substantially repeated except that dry pre-cooked oatmeal is substituted for the dog food. The resulting product has a rise in temperature substantially the same as that produced in accordance with Example 1.

EXAMPLE 4

The procedure of Example 2 is substantially repeated except that dry pre-cooked oatmeal is substituted for the dog food. The resulting product has a rise in temperature substantially the same as that produced in accordance with Example 2.

In place of the particular chemical composition and aqueous liquids employed in the examples, other compositions and aqueous liquids may be employed as hereinbefore described to obtain substantially the same results.

I claim:

1. A method for producing a novel food product which comprises contacting and substantially coating the surfaces of a dry food product with an edible chemically reactive composition and contacting said coated product with an aqueous liquid, said chemically reactive composition being capable of exothermically reacting with said aqueous liquid upon contact therewith to produce a resulting heated food product.

2. The method according to claim 1 wherein the chemically reactive composition is calcium oxide.

3. The method according to claim 1 wherein the chemically reactive composition is present in an amount from about .003% to about 10% by weight.

4. The method according to claim 1 wherein the aqueous liquid is water.

5. The method according to claim 1 wherein the aqueous liquid is a mixture of water containing a minor amount of an edible acid.

6. The method according to claim 5 wherein the edible acid is present in an amount from about .05% to about 15% by weight.

7. The method according to claim 5 wherein the edible acid is phosphoric acid.

8. The method according to claim 1 wherein the dry food product contains 10% or less of food moisture.

9. A novel food product capable of producing an exothermic reaction when contacted with an aqueous liquid to form a resulting heated food product which comprises a dry food product having contacted on the surfaces thereof an edible chemically reactive composition capable of exothermically reacting with said liquid.

10. The product according to claim 9 wherein the chemically reactive composition is calcium oxide.

11. The product according to claim 9 wherein the chemically reactive composition is present in an amount from about .003% to about 10% by weight.

12. The product according to claim 9 wherein the dry food product contains 10% or less moisture.

13. A novel dry food product capable of producing a rapid exothermic reaction to form a heated food product when contacted with an aqueous liquid which contains an edible acid in an amount from about .05% to about 15% by weight and which has contacted on the surfaces of the product an edible chemically reactive composition capable of rapid exothermic reaction with an aqueous liquid.

14. The product according to claim 13 wherein the chemically reactive composition is calcium oxide.

15. The product according to claim 13 wherein the chemically reactive composition is present in an amount from about .003% to about 10% by weight.

16. The product according to claim 13 wherein the dry food product contains 10% or less moisture.

References Cited

UNITED STATES PATENTS

| 2,497,612 | 2/1950 | Katzman | 126—263X |
|---|---|---|---|
| 2,579,405 | 12/1951 | Sukacev | 99—171H(UX) |
| 3,119,691 | 1/1964 | Ludington et al. | 99—2 |
| 3,052,371 | 9/1962 | Van Bemmelen | 206—47X |
| 3,121,637 | 2/1964 | Clausi et al. | 99—80 |
| 3,359,119 | 12/1967 | Milton | 99—166 |

OTHER REFERENCES

The Condensed Chemical Dictionary, 5th ed., Reinhold Publishing Corp., N.Y. 1956, p. 207.

FRANK W. LUTTER, Primary Examiner

W. L. MENTLIK, Assistant Examiner

U.S. Cl. X.R.

99—2, 83, 166